(12) United States Patent
Pedersen et al.

(10) Patent No.: US 10,979,832 B2
(45) Date of Patent: *Apr. 13, 2021

(54) RIGHTS MANAGEMENT IN A HEARING DEVICE

(71) Applicant: GN Hearing A/S, Ballerup (DK)

(72) Inventors: Brian Dam Pedersen, Ringsted (DK); Allan Munk Vendelbo, Valby (DK)

(73) Assignee: GN Hearing A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,549

(22) Filed: Sep. 13, 2018

(65) Prior Publication Data

US 2019/0014428 A1 Jan. 10, 2019

Related U.S. Application Data

(63) Continuation of application No. 14/793,515, filed on Jul. 7, 2015, now Pat. No. 10,158,955.

(30) Foreign Application Priority Data

Jul. 2, 2015 (DK) .......................... PA 2015 70432
Jul. 2, 2015 (EP) ..................................... 15175135

(51) Int. Cl.
*H04R 25/00* (2006.01)
*G06F 21/33* (2013.01)

(52) U.S. Cl.
CPC ........... *H04R 25/70* (2013.01); *G06F 21/335* (2013.01); *H04R 2225/61* (2013.01)

(58) Field of Classification Search
CPC .... H04R 25/70; H04R 2225/61; G06F 21/335

USPC .......................................................... 726/19
See application file for complete search history.

(56) References Cited

U.S. PATENT DOCUMENTS

| | | |
|---|---|---|
| 5,757,920 A | 5/1998 | Misra et al. |
| 5,809,140 A | 9/1998 | Rubin et al. |
| 6,055,575 A | 4/2000 | Paulsen |
| 6,556,686 B1 | 4/2003 | Weidner |
| 6,658,307 B1 | 12/2003 | Mueller |
| 6,724,862 B1 | 4/2004 | Shaffer |
| 8,166,312 B2 | 4/2012 | Waldmann et al. |

(Continued)

FOREIGN PATENT DOCUMENTS

| | | |
|---|---|---|
| DE | 102 00 796 A1 | 7/2003 |
| DK | 2013/70266 A1 | 11/2014 |

(Continued)

OTHER PUBLICATIONS

Extended European Search Report dated Nov. 20, 2015 for related EP Patent Application No. 15175137.7.

(Continued)

*Primary Examiner* — Mohammad W Reza
(74) *Attorney, Agent, or Firm* — Vista IP Law Group, LLP

(57) ABSTRACT

A hearing device includes: a processing unit configured to compensate for hearing loss of a user of the hearing device; and a memory unit; wherein the processing unit is configured to: obtain an access right certificate, the access right certificate comprising an access right identifier, verify the access right certificate, and if the access right certificate is verified, provide an access right according to the access right identifier.

16 Claims, 9 Drawing Sheets

(56) References Cited

U.S. PATENT DOCUMENTS

| | | | |
|---|---|---|---|
| 8,670,355 B1 | 3/2014 | Frerking | |
| 8,812,851 B2 | 8/2014 | Schwarz | |
| 9,119,009 B1* | 8/2015 | Folkmanis | ............ H04R 25/55 |
| 9,219,966 B2 | 12/2015 | Wang | |
| 9,402,179 B1 | 7/2016 | Miller | |
| 9,608,807 B2 | 3/2017 | Pedersen et al. | |
| 9,613,028 B2 | 4/2017 | Foo | |
| 10,652,673 B2 | 5/2020 | Pedersen et al. | |
| 2002/0054689 A1 | 5/2002 | Zhang et al. | |
| 2002/0169717 A1 | 11/2002 | Challener | |
| 2002/0196159 A1 | 12/2002 | Lesenne et al. | |
| 2004/0071304 A1 | 4/2004 | Yanz | |
| 2004/0117650 A1 | 6/2004 | Karaoguz et al. | |
| 2004/0117818 A1 | 6/2004 | Karaoguz et al. | |
| 2004/0125958 A1 | 7/2004 | Brewster | |
| 2004/0162980 A1 | 8/2004 | Lesenne et al. | |
| 2005/0154889 A1 | 7/2005 | Ashley et al. | |
| 2006/0005237 A1 | 1/2006 | Kobata et al. | |
| 2006/0129848 A1 | 6/2006 | Paksoy | |
| 2007/0078866 A1 | 4/2007 | Takashima | |
| 2008/0049957 A1 | 2/2008 | Topholm | |
| 2009/0210699 A1 | 8/2009 | Grewal et al. | |
| 2010/0067711 A1 | 3/2010 | Waldmann | |
| 2010/0104122 A1 | 4/2010 | Waldmann | |
| 2010/0205447 A1 | 8/2010 | Waldmann | |
| 2010/0290627 A1 | 11/2010 | Tsuji et al. | |
| 2010/0306525 A1 | 12/2010 | Ferguson | |
| 2011/0188684 A1 | 8/2011 | Spieler et al. | |
| 2011/0293124 A1 | 12/2011 | Ma | |
| 2012/0036364 A1 | 2/2012 | Yoneda et al. | |
| 2012/0140962 A1 | 6/2012 | Ubezio et al. | |
| 2012/0252411 A1 | 10/2012 | Johnsgard et al. | |
| 2012/0252531 A1 | 10/2012 | King | |
| 2013/0024798 A1 | 1/2013 | Schneider | |
| 2013/0077791 A1 | 3/2013 | Kozuka et al. | |
| 2013/0177188 A1 | 7/2013 | Apfel | |
| 2013/0177189 A1 | 7/2013 | Bryant | |
| 2013/0202138 A1 | 8/2013 | Nishizaki et al. | |
| 2013/0251179 A1 | 9/2013 | Aschoff | |
| 2013/0257364 A1 | 10/2013 | Redding | |
| 2013/0290733 A1 | 10/2013 | Branton et al. | |
| 2013/0290734 A1 | 10/2013 | Branton et al. | |
| 2013/0329924 A1 | 12/2013 | Fleizach | |
| 2014/0004825 A1 | 1/2014 | Prakash | |
| 2014/0050341 A1 | 2/2014 | Flynn | |
| 2014/0193008 A1 | 7/2014 | Zukic | |
| 2014/0211973 A1 | 7/2014 | Wang et al. | |
| 2014/0289516 A1 | 9/2014 | Sahay | |
| 2014/0331064 A1 | 11/2014 | Ballesteros | |
| 2014/0334629 A1 | 11/2014 | Andersen et al. | |
| 2014/0341405 A1 | 11/2014 | Pedersen et al. | |
| 2015/0023512 A1 | 1/2015 | Shennib | |
| 2015/0023534 A1 | 1/2015 | Shennib | |
| 2015/0281863 A1* | 10/2015 | Westergaard | .......... H04R 25/70 381/60 |
| 2015/0289062 A1 | 10/2015 | Ungstrup | |
| 2016/0142838 A1 | 5/2016 | Thomsen | |
| 2016/0198271 A1 | 7/2016 | Shennib | |
| 2016/0255448 A1 | 9/2016 | Morant | |
| 2016/0337769 A1 | 11/2016 | Siddhartha | |
| 2017/0099550 A1 | 4/2017 | Blessing | |
| 2017/0180419 A1 | 6/2017 | Pedersen et al. | |
| 2017/0180886 A1* | 6/2017 | Van Der Loo | ....... H04R 25/554 |
| 2017/0286918 A1 | 10/2017 | Westermann | |
| 2017/0318400 A1* | 11/2017 | Westermann | ........ H04R 25/554 |
| 2017/0318457 A1 | 11/2017 | Westermann | |

FOREIGN PATENT DOCUMENTS

| | | | |
|---|---|---|---|
| EP | 1 582 958 A2 | 10/2005 | |
| EP | 2 760 225 A1 | 7/2014 | |
| EP | 2 928 212 A1 | 10/2015 | |
| EP | 3 021 545 A1 | 5/2016 | |
| EP | 3 032 845 A1 | 6/2016 | |
| WO | WO 2007/098605 A1 | 9/2007 | |
| WO | WO 2007/144435 A2 | 12/2007 | |
| WO | WO 2007/144435 A3 | 12/2007 | |
| WO | WO 2010/075343 A2 | 7/2010 | |
| WO | WO 2013/091693 A1 | 6/2013 | |
| WO | WO 2014/094866 A1 | 6/2014 | |
| WO | WO 2015132419 A2 | 9/2015 | |
| WO | WO 2016/078711 | 5/2016 | |
| WO | WO-2016078711 A1 * | 5/2016 | ......... G06F 19/3418 |
| WO | WO 2016/096011 | 6/2016 | |
| WO | WO-2016096011 A1 * | 6/2016 | ............. G06Q 10/20 |

OTHER PUBLICATIONS

Extended European Search Report dated Dec. 14, 2015 for related EP Patent Application No. 15175135.1.

Joann Spera, "SSL client authentication: It's a matter of trust", Mar. 2, 1998.

Li Wei, "Improvement Method of SSL Protocol Identity Authentication based on the Attribute Certificate", 2012 International Conference on Computer Science and Service System, IEEE Computer Society, Aug. 11, 2012.

Extended European Search Report dated Jan. 4, 2016 for related EP Patent Application No. 151751378.5.

John Padgette, et al., "Guide to Bluetooth Security Recommendations of the National Institute of Standards and Technology", Jun. 2012.

"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.

"Message Sequence Charts, 4 Optional Activities After ACL Connection Establishment, 4.2 Simple Pairing Message Sequence Charts" In: Bluetooth Specification v4.0, Core System Package, Bluetooth.com, vol. 2, Jun. 30, 2010.

"Security Specification" In: Bluetooth Specification v4.0, Core System Package, Bluetooth.com, vol. 2, Jun. 30, 2010.

Extended European Search Report dated Dec. 14, 2015 for related EP Patent Application No. 15175141.9.

Vincent Bernat: "Speeding up SSL: enabling session reuse", Sep. 27, 2011.

Extended European Search Report dated Dec. 23, 2015 for related EP Patent Application No. 15175139.3.

Leicher A et al., "Implementation of a Trusted Ticket System", Emerging Challenges for Security, Privacy and Trust. IFIP Advances in Information and Communication Technology, vol. 297, Jan. 1, 2009.

First Technical Examination and Search Report dated Jan. 25, 2016 for corresponding/related Danish Patent Application No. PA 2015 70437, 5 pages.

Extended European Search Report dated Jan. 11, 2016 for corresponding/related EP Patent Application No. 15175142.7, 10 pages.

Gary C. Kessler, "An Overview of Cryptography", Nov. 17, 2006.

Menezes et al., "Handbook of Applied Cryptography, Key Management Techniques", Jan. 1, 1997.

First Technical Examination and Search Report dated Feb. 23, 2016 for corresponding/related Danish Patent Application No. PA 2015 70435, 5 pages.

Extended European Search Report dated Jan. 12, 2016 for corresponding/related EP Patent Application No. 15175140.1, 8 pages.

First Technical Examination and Search Report dated Feb. 25, 2016 for corresponding/related Danish Patent Application No. PA 2015 70436.

First Technical Examination and Search Report dated Feb. 25, 2016 for corresponding/related Danish Patent Application No. PA 2015 70434.

First Technical Examination and Search Report dated Feb. 22, 2016 for corresponding/related Danish Patent Application No. PA 2015 70432.

First Technical Examination and Search Report dated Feb. 29, 2016 for corresponding/related Danish Patent Application No. PA 2015 70433.

(56) References Cited

OTHER PUBLICATIONS

First Technical Examination and Search Report dated Feb. 25, 2016 for corresponding/related Danish Patent Application No. PA 2015 70438.
Non-final Office Action dated Sep. 26, 2016 for related U.S. Appl. No. 14/799,402.
Non-final Office Action dated Sep. 30, 2016 for related U.S. Appl. No. 14/799,437.
Non-final Office action dated Oct. 7, 2016 for related U.S. Appl. No. 14/793,587.
Notice of Allowance and Fees Due dated Jan. 19, 2017 for related U.S. Appl. No. 14/793,466.
Non-final Office Action dated Feb. 10, 2017 for related U.S. Appl. No. 14/799,463.
Final Office Action dated Feb. 17, 2017 for related U.S. Appl. No. 14/799,402.
Notice of Allowance and Fees Due dated May 18, 2017 for related U.S. Appl. No. 14/799,338.
Final Office Action dated May 12, 2017 for related U.S. Appl. No. 14/793,587.
Second Technical Examination and Search Report dated Apr. 5, 2017 for corresponding/related Danish Patent Application No. PA 2015 70432, 3 pages.
Final Office Action dated May 30, 2017 for related U.S. Appl. No. 14/799,437.
Notice of Allowance and Fee(s) due dated Jun. 23, 2017 for related U.S. Appl. No. 14/799,463.
Notice of Allowance and Fee(s) due dated Jul. 11, 2017 for related U.S. Appl. No. 14/799,402.
Non-final Office Action dated Jul. 20, 2017 for related U.S. Appl. No. 15/595,526.
Non-final Office Action dated Jul. 21, 2017 for related U.S. Appl. No. 15/623,266.
Notice of Allowance and Fee(s) dated Aug. 24, 2017 for related U.S. Appl. No. 14/799,463.
Notice of Allowance and Fee(s) dated Sep. 13, 2017 for related U.S. Appl. No. 14/799,338.
Second Technical Examination dated Jul. 21, 2017 for corresponding/related Danish Patent Application No. PA 2015 70434, 3 pages.
Non-final Office Action dated Sep. 27, 2017 for related U.S. Appl. No. 15/697,406.
Advisory Action dated Oct. 23, 2017 for related U.S. Appl. No. 14/799,437.
Notice of Allowance and Fee(s) dated Oct. 6, 2017 for related U.S. Appl. No. 14/799,402.
Advisory Action dated Nov. 16, 2017 for related U.S. Appl. No. 14/793,587.
Notice of Allowance and Fee(s) due dated Nov. 3, 2017 for related U.S. Appl. No. 15/595,526.
Final Office Action dated Dec. 14, 2017 for related U.S. Appl. No. 15/623,266.
Non-final Office Action dated Dec. 21, 2017 for related U.S. Appl. No. 14/799,437.
Non-final Office Action dated Jan. 26, 2018 for related U.S. Appl. No. 14/799,463.
Adivsory Action dated Mar. 7, 2018 for related U.S. Appl. No. 15/623,266.
Communication pursuant to Article 94(3) dated Dec. 8, 2017 for related EP Patent Application No. 15175135.1.
Notice of Allowance dated Mar. 27, 2018 for related U.S. Appl. No. 15/623,266.
Communication pursuant to Article 94(3) dated Jan. 3, 2018 for corresponding EP Patent Application No. 15175141.9.
Non Final Office Action dated May 11, 2018 for related U.S. Appl. No. 15/941,816.
Non Final Office Action dated Apr. 20, 2018 for related U.S. Appl. No. 15/888,583.
Final Office Action dated May 17, 2018 for related U.S. Appl. No. 14/799,463.
Final Office Action dated Jul. 5, 2018 for related U.S. Appl. No. 14/799,437.
Notice of Allowance and Fee(s) dated Aug. 1, 2018 for related U.S. Appl. No. 14/799,463.
Non-final Office Action dated Sep. 22, 2016 for related U.S. Appl. No. 14/793,515.
Final Office Action dated Mar. 9, 2017 for U.S. Appl. No. 14/793,515.
Advisory Action dated Jun. 22, 2017 for related U.S. Appl. No. 14/793,515.
Non-final Office Action dated Aug. 14, 2017 for related U.S. Appl. No. 14/793,515.
Final Office Action dated Apr. 2, 2018 for related U.S. Appl. No. 14/793,515.
Notice of Allowance dated May 3, 2018 for related U.S. Appl. No. 14/793,587.
Advisory Action dated Jun. 25, 2018 for related U.S. Appl. No. 14/793,515.
Notice of Allowance and Fee(s) dated Jul. 31, 2018 for related U.S. Appl. No. 14/793,515.
Foreign Office Action dated Aug. 4, 2020 for Korean Appln. No. 2016-130838.

* cited by examiner

RIGHTS MANAGEMENT IN A HEARING DEVICE

RELATED APPLICATION DATA

This application is a continuation of U.S. patent application Ser. No. 14/793,515 filed on Jul. 7, 2015, pending, which claims priority to and the benefit of Danish Patent Application No. PA 2015 70432, filed on Jul. 2, 2015, and European Patent Application No. 15175135.1, filed on Jul. 2, 2015. The entire disclosures of the above applications are expressly incorporated by reference herein.

FIELD

The present disclosure relates to a hearing device and related method, in particular a method of operating a hearing device. Further, a method of configuring a hearing device is disclosed.

BACKGROUND

Development and testing of hearing device software requires access to a hearing device and the functionalities of a hearing device. Security architectures for hearing devices may limit the access and ability to test and run unauthorized software/firmware in a hearing device. Further, a hearing device manufacturer may in the interest of security prevent or limit access to the hearing device, e.g. by preventing a hearing device from running or even downloading unauthorized software. Further, a hearing device manufacturer may be interested in limiting the sharing of or access to security material, such as keying material, for authorizing firmware.

SUMMARY

There is a need for enabling a software developer to access and test software applications on an otherwise secure hearing device.

Disclosed is a hearing device comprising a processing unit configured to compensate for hearing loss of a user of the hearing device; a memory unit; and an interface. The processing unit may be configured to obtain an access right certificate, the access right certificate optionally comprising an access right identifier; verify the access right certificate; and if the access right certificate is verified, provide an access right according to the access right identifier.

Also disclosed is a method of operating a hearing device comprising a processing unit configured to compensate for hearing loss of a user of the hearing device; a memory unit; and an interface. The method comprises obtaining an access right certificate, the access right certificate optionally comprising an access right identifier; verifying the access right certificate; and if the access right certificate is verified, providing an access right according to the access right identifier.

Further, a method of configuring a hearing device is disclosed.

The method and apparatus as disclosed enables a software developer to access and test a hearing device on an otherwise secure hearing device, e.g. a hearing device that is configured only to run authorized firmware. Further, the present disclosure enables a hearing device manufacturer to limit access to authorizing firmware of a hearing device while still enabling easy testing and development of hearing device firmware.

A hearing device manufacturer is further able to control whether a specific hearing device can be used for software development and testing and to which degree. This may be advantageous since it may be desire to allow external developers to access the hearing device at a first level and to allow internal developers to access the hearing device at a second level different from the first level. For example, hearing devices for internal developers may be granted full access, while hearing devices for external developers may be granted a limited access. Further, hearing devices for software developers may be granted other access rights than hearing devices for software developers.

The disclosed hearing device and method of operating a hearing device supports a hearing device in combatting attacks such as unauthorized access or control of a hearing device, while still allowing access to legitimate parties for e.g. R&D purposes, such as testing.

A hearing device includes: a processing unit configured to compensate for hearing loss of a user of the hearing device; and a memory unit; wherein the processing unit is configured to: obtain an access right certificate, the access right certificate comprising an access right identifier, verify the access right certificate, and if the access right certificate is verified, provide an access right according to the access right identifier.

Optionally, the access right certificate comprises a digital signature, and wherein the processing unit is configured to verify the access right certificate by verifying the digital signature.

Optionally, the access right certificate comprises a certificate type identifier, and wherein the processing unit is configured to verify the access right certificate by verifying the certificate type identifier.

Optionally, the access right certificate comprises one or more hardware identifiers, and wherein the processing unit is configured to verify the access right certificate by verifying at least one of the one or more hardware identifiers.

Optionally, the access right certificate comprises a hardware platform identifier, a software platform identifier, a certificate timestamp, or any combination of the foregoing, and wherein the processing unit is configured to verify the access right certificate by verifying at least one of the hardware platform identifier, the software platform identifier, and the certificate timestamp.

Optionally, the processing unit is configured to obtain a firmware certificate and to verify the firmware certificate, and wherein the processing unit is configured to retrieve and verify the access right certificate if the firmware certificate is not verified.

Optionally, the processing unit is configured to grant full access to the hearing device if the access right identifier is indicative of allowance of the full access.

Optionally, the processing unit is configured to grant access to execute unauthorized firmware if the access right identifier is indicative of allowance of the unauthorized firmware being execution.

Optionally, the processing unit is configured to grant acces to store firmware in the memory unit if the access right identifier is indicative of allowance of the firmware being storing.

A method of operating a hearing device comprising a processing unit configured to compensate for hearing loss of a user of the hearing device and a memory unit, includes: obtaining an access right certificate, the access right certificate comprising an access right identifier; verifying the access right certificate; and if the access right certificate is verified, providing an access right according to the access right identifier.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
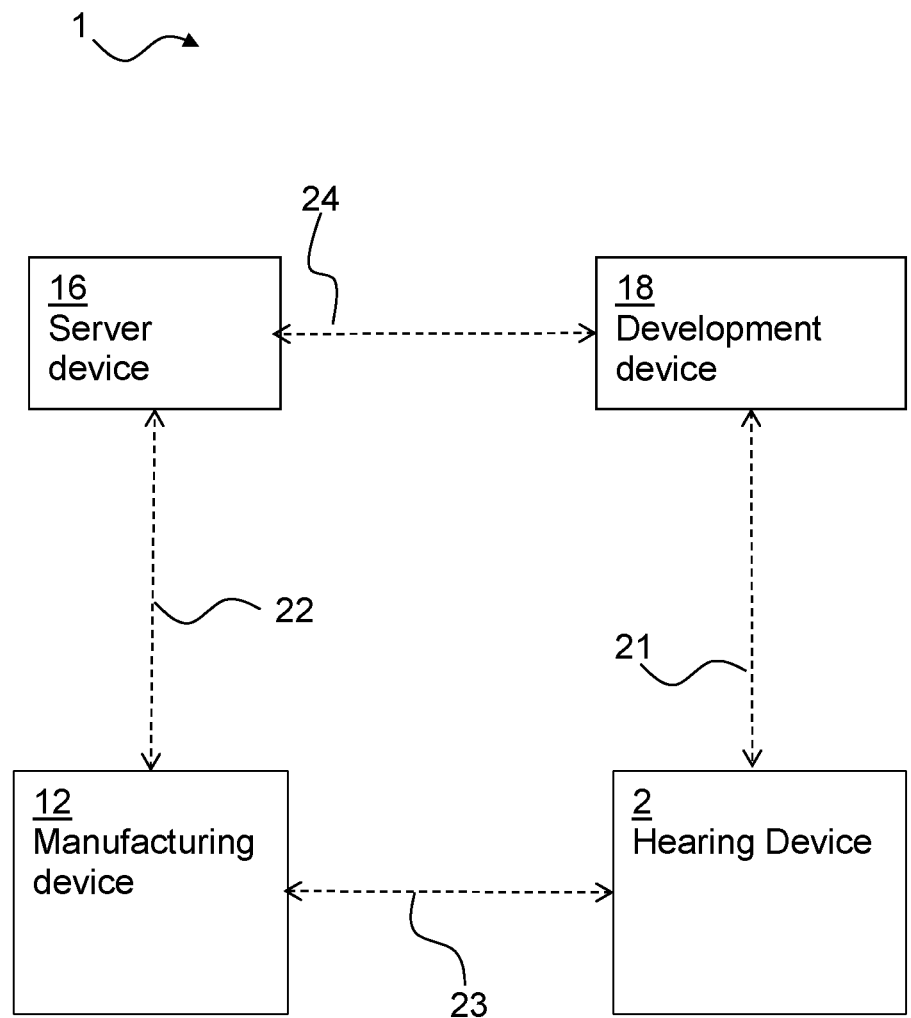
FIG. 1 schematically illustrates an exemplary architecture with a hearing device, FIG. 2 schematically illustrates an exemplary hearing device, FIG. 3 schematically illustrates an exemplary hearing device certificate, FIG. 4 schematically illustrates an exemplary access right certificate, FIG. 5 schematically illustrates a flowchart of an exemplary method, FIG. 6 schematically illustrates a flowchart of an exemplary method, FIG. 7 schematically illustrates an exemplary verification of an access right certificate, FIG. 8 schematically illustrates a flowchart of an exemplary method, and FIG. 9 schematically illustrates a flowchart of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

It is an object of the present disclosure to provide a hearing device, and a method of operating a hearing device which seeks to mitigate, alleviate, or eliminate one or more of the above-identified deficiencies in the art and disadvantages singly or in any combination.

The present disclosure relates to improved security of a hearing device with maintained development flexibility.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate comprises a digital signature, so that a recipient of the certificate is able to verify or authenticate the certificate content and origin. The certificate may comprise one or more identifiers and/or keying material, such as one or more cryptographic keys (e.g. a hearing device key) enabling secure communication in a hearing device system. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, etc., such as an array of unsigned integers.

The present disclosure relates to a hearing device. The hearing device comprises a processing unit, a memory unit and an interface. The memory unit may include removable and non-removable data storage units including, but not limited to, Read Only Memory (ROM), Random Access Memory (RAM), etc. The memory unit may have a hearing device certificate stored thereon. The memory unit may have the hearing device certificate stored at a memory address of the memory unit, and/or in memory cells of the memory unit, such as in designated memory cells and/or at designated addresses. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device and/or another hearing device, respectively comprising a wireless transceiver configured to receive and/or transmit data.

The processing unit is configured to obtain an access right certificate, e.g. from the memory unit and/or via the interface. To obtain an access right certificate may comprise retrieving the access right certificate from the memory unit. Thus the access right certificate may be stored in the memory unit of the hearing device. The access right certificate may comprise an access right identifier. The access right identifier may be indicative of one or more access rights associated with the access right certificate/hearing device.

The access right certificate may comprise a digital signature, and to verify the access right certificate may comprise to verify the digital signature. The digital signature enables a proof or verification of authenticity of the access right certificate, such as verification of the signer legitimacy. The digital signature is optionally generated by a manufacturing device using a access right private key. The hearing device may be configured to verify the digital signature of the access right certificate when obtaining. The digital signature is verifiable by the hearing device using a corresponding access right public key. If the digital signature is not successfully verified using the alleged public key, the hearing device access right certificate is not verified. This may provide the advantage that the hearing device rejects an access right certificate that is tampered or received from unauthenticated parties.

The access right certificate may comprise a certificate type identifier. The certificate type identifier may indicate a type of the certificate amongst a variety of certificate types, such as a hearing device family certificate type, a hearing device certificate type, a firmware certificate type, an access right certificate type, client device certificate type. The certificate type identifier may be used by the hearing device to identify what type of certificate it receives, stores, and/or retrieves/obtains. The access right certificate may comprise a version identifier indicative of a data format version of the certificate. The hearing device may be configured to use the certificate type identifier and/or the version identifier to determine what type of data the certificate comprises and/or what type of data is comprised in a field of the certificate. For example, the hearing device may determine based on the certificate type identifier and/or version identifier what field of the certificate comprises a digital signature and/or which public key is needed to verify the digital signature. It may be envisaged that there is a one-to-one mapping between the certificate type identifier and the public-private key pair.

The access right certificate may comprise a signing device identifier. The signing device identifier refers to a unique identifier identifying the device (such as a manufacturing device, e.g. an integrated circuit card, a smart card, a hardware security module) that has signed the access right certificate. The signing device identifier may for example comprise a medium access control, MAC, address of the signing device and/or a serial number. The signing device identifier optionally allows for example the hearing device to determine whether the signing device is e.g. black-listed or not, and thus to reject/not verify certificates signed by a signing device that is black-listed.

The access right certificate may comprise one or more hardware identifiers. To verify the access right certificate may comprise to verify at least one of the one or more hardware identifiers. A hardware identifier may identify a piece of hardware comprised in the hearing device, such as a radio chip (part of the interface) comprised in the hearing device or the processing unit of the hearing device. A hardware identifier may be stored in a register of the piece of hardware comprised in the hearing device during manufacturing of the piece of hardware. A hardware identifier may comprise a serial number, a medium access control, MAC, address, a chip identifier, or any combination thereof. The one or more hardware identifiers may include one or both of a first hardware identifier indicative of a hardware identifier of the processing unit and a second hardware identifier indicative of a hardware identifier of the interface, such as a hardware identifier of a radio transceiver (radio chip) of the interface.

The access right certificate may comprise a hardware platform identifier, e.g. indicative of a hardware platform of the hearing device. The hardware platform identifier may identify a hardware platform, such as an operational hearing device hardware platform, i.e. a hardware platform compatible with the hearing device.

The access right certificate may comprise a software platform identifier, e.g. indicative of a software platform of the hearing device. The software platform identifier may identify a family of software platforms on which the hearing device is configured to operate.

The access right certificate may comprise a certificate timestamp. The certificate timestamp refers to a timestamp of production or manufacture of the access right certificate, such as a timestamp of the manufacturing device indicating a time instant when the access right certificate is generated. The certificate timestamp may be in form of e.g.: hour, min, date, month, year.

The access right certificate may comprise an issuer identifier, e.g. indicative of the person who has signed the access right certificate.

The access right certificate may comprise an addressee identifier, e.g. indicative of the person/group requesting the access right certificate.

The processing unit is configured to verify the access right certificate.

To verify the access right certificate may be based on the hearing device certificate stored in the memory of the hearing device.

The hearing device certificate may comprise one or more hardware identifiers. A hardware identifier may identify a piece of hardware comprised in the hearing device, such as a radio chip (part of the interface) comprised in the hearing device or the processing unit of the hearing device. A hardware identifier may be stored in a register of the piece of hardware comprised in the hearing device during manufacturing of the piece of hardware. A hardware identifier may comprise a serial number, a medium access control, MAC, address, a chip identifier, or any combination thereof. The one or more hardware identifiers of the hearing device certificate may include one or both of a first hardware identifier indicative of a hardware identifier of the processing unit and a second hardware identifier indicative of a hardware identifier of the interface, such as a hardware identifier of a radio transceiver (radio chip) of the interface.

The hearing device certificate may comprise a hardware platform identifier, e.g. indicative of a hardware platform of the hearing device. The hardware platform identifier may identify a hardware platform, such as an operational hearing device hardware platform, i.e. a hardware platform compatible with the hearing device.

The hearing device certificate may comprise a software platform identifier, e.g. indicative of a software platform of the hearing device. The software platform identifier may identify a family of software platforms on which the hearing device is configured to operate.

The hearing device certificate may comprise a certificate timestamp. The certificate timestamp refers to a timestamp of production or manufacture of the hearing device certificate, such as a timestamp of the manufacturing device indicating a time instant when the hearing device certificate is generated. The certificate timestamp may be in form of e.g.: hour, min, date, month, year.

To verify the access right certificate may comprise to verify the certificate type identifier.

To verify the access right certificate may comprise to verify the version identifier, e.g. by verifying that the version indicated by the version identifier is supported by the firmware.

To verify the access right certificate may comprise to verify at least one of the one or more hardware identifiers. To verify at least one of the one or more hardware identifiers may be based on the actual values in the respective hardware registers and/or based on the hearing device certificate or at least parts thereof. To verify at least one of the one or more hardware identifiers may comprise to verify that the first hardware identifier of the access right certificate corresponds to the actual value of the corresponding hardware register. To verify at least one of the one or more hardware identifiers may comprise to verify that the second hardware identifier of the access right certificate corresponds to the actual value of the corresponding hardware register. To verify at least one of the one or more hardware identifiers may comprise to verify that the first hardware identifier of the access right certificate corresponds to the first hardware identifier of the hearing device. To verify at least one of the one or more hardware identifiers may comprise to verify that the second hardware identifier of the access right certificate corresponds to the second hardware identifier of the hearing device.

To verify the access right certificate may comprise to verify the signing device identifier. To verify the signing device identifier may comprise to verify that the signing device identifier is not black-listed, e.g. by appearing on a list of black-listed signing device identifiers. Verification then fails if the processing unit determines that the signing device identifier is black-listed.

To verify the access right certificate may comprise to verify the hardware platform identifier, e.g. based on the hearing device certificate or at least parts thereof. To verify the hardware platform identifier may comprise to verify that the hardware platform identifier of the access right certificate corresponds to the hardware platform identifier of the hearing device certificate.

To verify the access right certificate may comprise to verify the software platform identifier, e.g. based on the hearing device certificate or at least parts thereof. To verify the software platform identifier may comprise to verify that the software platform identifier corresponds to the software platform identifier of the hearing device certificate.

To verify the access right certificate may comprise to verify the certificate timestamp, e.g. based on the hearing device certificate or at least parts thereof. To verify the certificate timestamp may comprise to verify that the certificate timestamp of the access right certificate is later in time than the certificate timestamp of the hearing device certificate.

To obtain and verify the access right certificate may be conditional, e.g. based on verification of firmware, e.g. based on a firmware certificate. The processing unit may be configured to verify firmware. For example, the processing unit may be configured to obtain a firmware certificate, e.g. from the memory unit and/or via the interface, and to verify the firmware certificate, e.g. based on a digital signature of the firmware certificate. If the firmware, e.g. the firmware certificate, is not verified, the processing unit may be configured to obtain and verify the access right certificate and provide an access right according to the access right identifier if the access right certificate is verified. A conditional verification of the access right certificate enables a power-efficient hearing device. In one or more embodiments, the processing unit may be configured to determine if the firmware, such as a digital signature of the firmware certificate, is indicative of being non-authorized. For example, the digital signature of the firmware certificate may be set to a default value, e.g. zero, to indicate that the firmware is not authorized. Hereby, the hearing device may save complex and time/power consuming signature verification and proceed directly to obtaining an access right certificate. If the digital signature of the firmware certificate is not equal to the default value, the processing unit may proceed to obtain an access right certificate.

The processing unit is configured to, e.g. if the access right certificate is verified, provide an access right according to the access right identifier.

To provide an access right according to the access right identifier may comprise to allow control of one or more hearing device features.

In one or more exemplary hearing devices, the processing unit is configured to grant full access to the hearing device if the access right identifier is indicative of full access allowed. Thus, to provide an access right according to the access right identifier may comprise to grant full access to the hearing device if the access right identifier is indicative of full access allowed. Full access to the hearing device may be defined as allowing access to read and write to all parts of the memory unit, to read from all hardware register and to write to all writable hardware registers of the hearing device.

In one or more exemplary hearing devices, the processing unit is configured to grant access to tracing of one or more hardware registers, if the access right identifier is indicative of hardware register access allowed. Thus, to provide an access right according to the access right identifier may comprise to grant access to tracing of one or more hardware registers, if the access right identifier is indicative of hardware register access allowed.

In one or more exemplary hearing devices, the processing unit is configured to grant access to execute unauthorized firmware if the access right identifier is indicative of unauthorized firmware execution allowed. Thus to provide an access right according to the access right identifier may comprise to grant access to execute unauthorized firmware if the access right identifier is indicative of unauthorized firmware execution allowed.

In one or more exemplary hearing devices, the processing unit is configured to grant access to store firmware in the memory unit if the access right identifier is indicative of firmware storing allowed. Thus to provide an access right according to the access right identifier may comprise to grant access to store firmware in the memory unit if the access right identifier is indicative of firmware storing allowed.

Also disclosed is a hearing device, wherein the processing unit may be configured to obtain an access right certificate via the interface; verify the access right certificate; and, if the access right certificate is verified, store the access right certificate in the memory unit. Further, a method of configuring a hearing device is disclosed, the method including obtaining an access right certificate; verifying the access right certificate; and, if the access right certificate is verified, storing the access right certificate in a memory unit of the hearing device.

The processing unit may be configured to, if the access right certificate is not verified, abort normal operation.

FIG. 1 schematically illustrates exemplary devices that may be used for manufacturing, development, maintenance/update of, and/or operating a hearing device 2. FIG. 1 shows an exemplary system 1 and a hearing device 2. The system 1 may comprise one or more of a manufacturing device 12, a server device 16 and a development device 18 for manufacturing, development, maintenance/update of, and/or operating the hearing device 2. The manufacturing device 12 may be configured to transmit/install a hearing device certificate in the hearing device. The hearing device 2 may be configured to compensate for hearing loss of a user of the hearing device 2. The hearing device 2 may be configured to communicate with the manufacturing device 12 using e.g. a communication link 23, such as a uni or bi-directional communication link. The communication link 23 may be a wired link and/or wireless communication link. The communication link 23 may be a single hop communication link or a multi-hop communication link. The wireless communication link may be carried over a short-range communication system, such as Bluetooth, Bluetooth low energy, IEEE 802.11, Zigbee. The hearing device 2 may be configured to receive a hearing device certificate from the manufacturing device 12 and to store the hearing device certificate in a memory unit comprised in the hearing device 2. Alternatively or additionally, the manufacturing device 12 may store the hearing device certificate directly in the memory unit of the hearing device. For example, the manufacturing device 12 may write the hearing device certificate in the memory unit. For example, during manufacturing of the hearing device 2, the manufacturing device 12 connects to the hearing device 2 and transmits the hearing device certificate to the hearing device 2. The hearing device may receive and store the hearing device certificate. The hearing device 2 may be configured to connect to the development device 18 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as Bluetooth, Bluetooth low energy, IEEE 802.11, Zigbee. The hearing device 2 may configured to connect to the development device 18 over a network. The development device 18 may be configured to communicate with the server device 16 via a communication link 24, such as a bidirectional communication link. The communication link 24 may be a wired link and/or wireless communication link. The communication link 24 may comprise a network, such as the Internet. The development device 18 may be configured to communicate with the server device 16 for maintenance, and update purposes. The server device 16 may comprise a computing device configured to act as a server, i.e. to serve requests from the development device 18 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
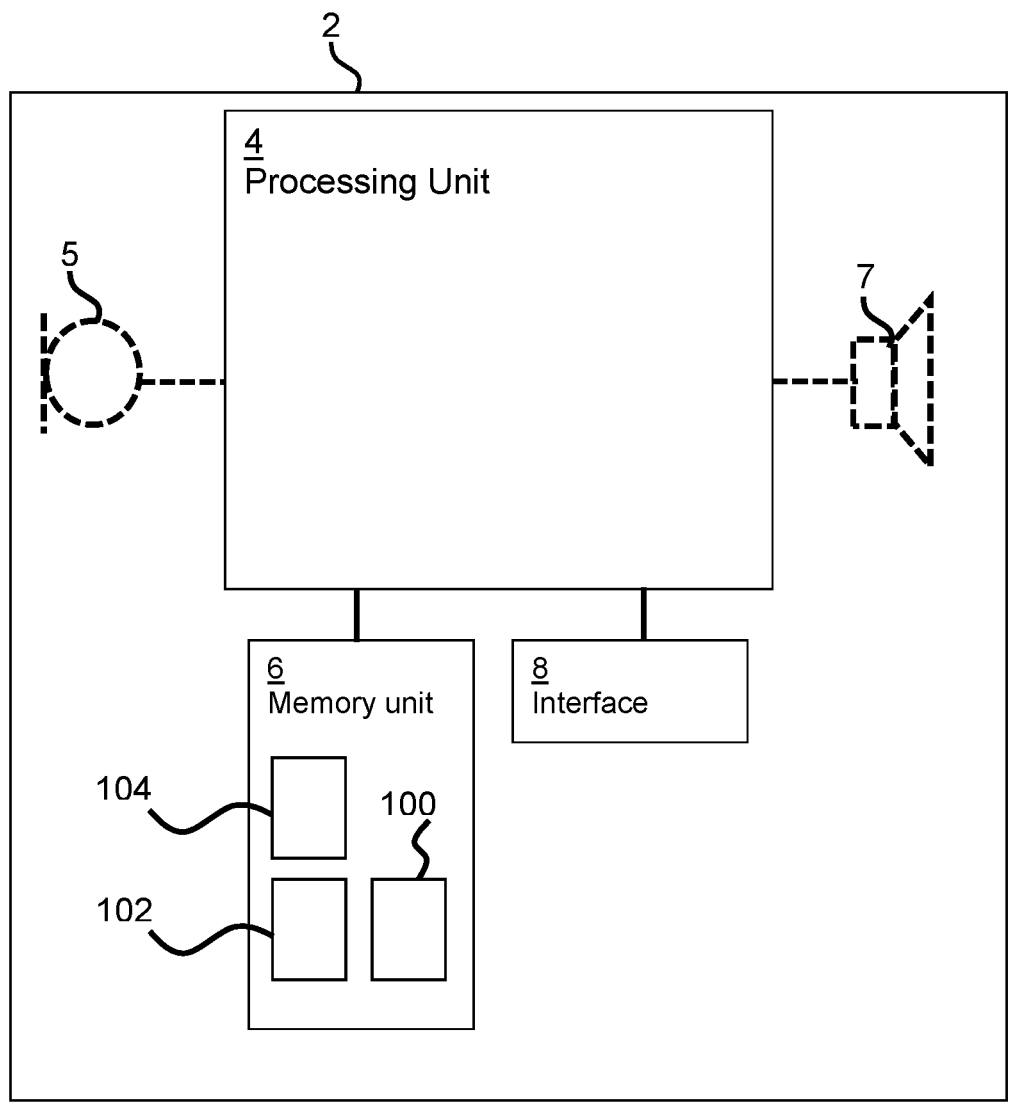

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 optionally comprises a wireless transceiver, e.g. configured for wireless communication at frequencies in the range from 2.4 to 2.5 GHz. The interface 8 is configured for communication, such as wired and/or wireless communication, with a manufacturing device 12 and/or a development device 18. The processing unit 4 may be configured to compensate for hearing loss of a user of the hearing aid. The hearing device 2 optionally comprises a microphone 5 or a plurality of microphones for receiving sound signal(s) and converting sound signal(s) into converted sound signal(s). In one or more exemplary hearing devices, a wireless transceiver of the interface may also provide one or more converted sound signal(s), e.g. from an external sound source such as a mobile phone or sound system with wireless transmitter. The converted sound signal(s) may be an electrical and/or digital version of the sound signal. The processing unit 4 is configured to receive and process the converted sound signal(s) into a processed sound signal according to a hearing loss of a user of the hearing device 2. The processed sound signal may be compressed and/or amplified or the like. The hearing device 2 comprises an output transducer/loudspeaker 7, known as a receiver. The receiver 7 is configured to receive the processed sound signal and convert the processed sound signal to an output sound signal for reception by an eardrum of the user. A hearing device certificate 100 is stored in the memory unit 6. Further, an access right certificate 102 may be stored in the memory unit 6. Optionally, a firmware certificate 104 may be stored in the memory unit 6. The processing unit 4 is configured to obtain an access right certificate by retrieving the access right certificate 102 from the memory unit. The access right certificate comprises an access right identifier. The processing unit 4 is configured to verify the access right certificate; and if the access right certificate 100 is verified, provide an access right according to the access right identifier.

Figure 3:
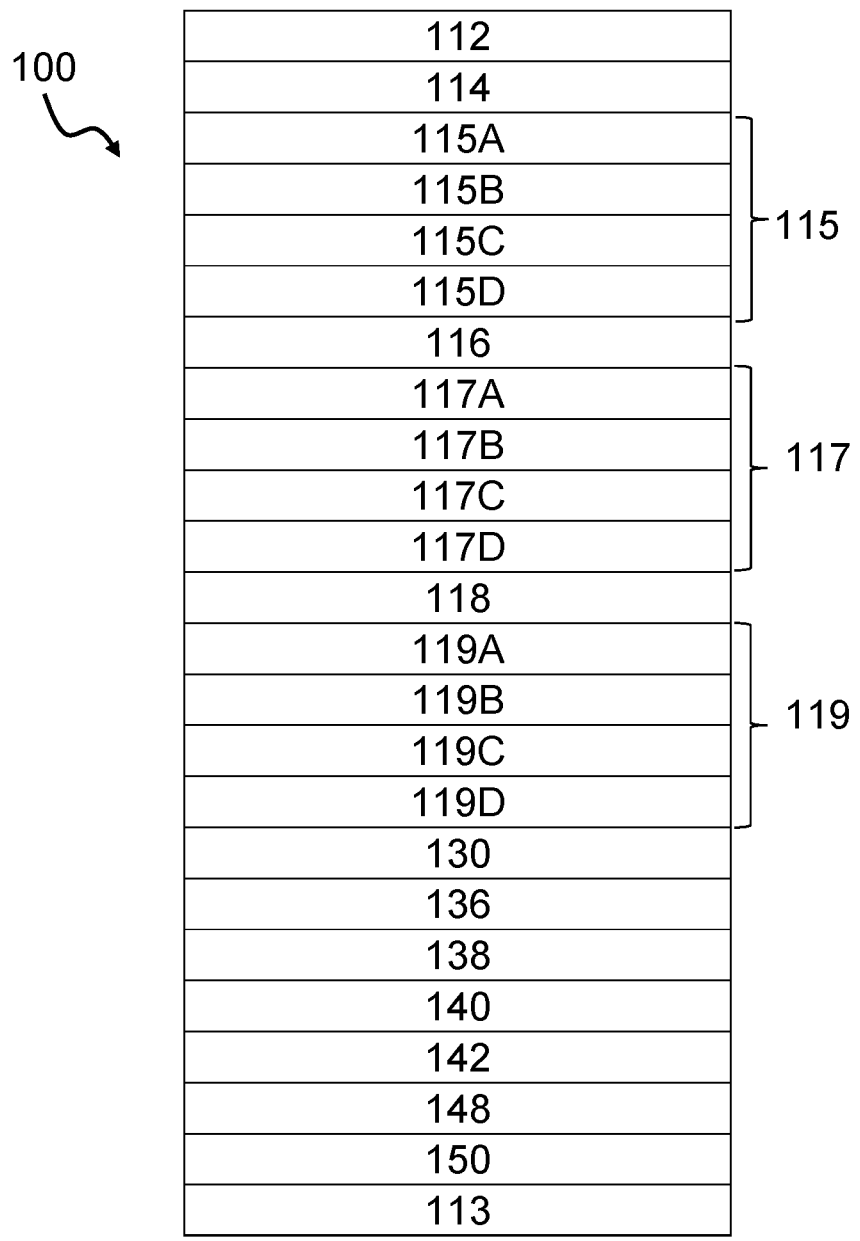

FIG. 3 schematically illustrates an exemplary hearing device certificate 100. The hearing device certificate 100 optionally comprises a hearing device identifier 112, at least one hearing device key identifier including a first hearing device key identifier 114 indicative of a hearing device key and one or a plurality of hearing device keys. The hearing device identifier 112 may refer to a unique or a pseudo-unique identifier. The first hearing device key identifier 114 is indicative of the first hearing device key(s) of the hearing device certificate. For example, the first hearing device key identifier 114 may be indicative of or point to a hearing device key of a first set 115 of hearing device keys (115A, 115B, 115C, 115D) of the hearing device certificate, e.g. the first primary hearing device key 115A. The hearing device certificate 100 optionally comprises two, three, four or more sets of hearing device keys enabling secure communication with different client devices/client device types. The hearing device certificate 100 comprises a first set 115 of hearing device keys including a first primary hearing device key 115A. The at least one hearing device key identifier comprises a first hearing device key identifier 114 indicative of a hearing device key of the first set 115 of hearing device keys 115A, 115B, 115C, 115D. The first set 115 of hearing device keys comprises for example first primary key 115A, first secondary key 115B, first tertiary key 115C, and first quaternary key 115D dedicated to securing communication to and from a first client device or a first client device type. For example, the first set 115 of hearing devices key may be a set of hearing device keys 115A, 115B, 115C, 115D for securing communication of hearing device data with the first client device.

The plurality of hearing device keys may comprise a second set 117 of hearing device keys including a second primary hearing device key 117A, a second secondary hearing device key 117B, a second tertiary hearing device key 117C, and/or a second quaternary hearing device key 117D. The at least one hearing device key identifier comprises a second hearing device key identifier 116 indicative of a hearing device key of the second set 117 of hearing device keys 117A, 117B, 117C, 117D. The hearing device may be configured to communicate with one or more client devices, such as a first client device and/or a second client device. For each client device or client device type that the hearing device is configured to communicate with, the hearing device certificate optionally comprises a set of hearing device keys configured to enable secure communication with a specific client device or client device type. The hearing device certificate may comprise a third set 119 of hearing device keys including a third primary hearing device key 119A, a third secondary hearing device key 119B, a third tertiary hearing device key 119C, and/or a third quaternary hearing device key 119D. The at least one hearing device key identifier comprises a third hearing device key identifier 118 indicative of a hearing device key of the third set 119 of hearing device keys. The hearing device certificate 100 may comprise a fourth set of hearing device keys including a fourth primary hearing device key (not shown). The at least one hearing device key identifier comprises a fourth hearing device key identifier indicative of a hearing device key of the fourth set of hearing device keys. The hearing device 2 may be configured to select a set of hearing device keys based on the client device or the client device type connected to the hearing device and to select a hearing device key from the set of hearing device keys selected based on the hearing device key identifier associated with the selected set of hearing devices.

The hearing device certificate 100 comprises a certificate type identifier 130. The certificate type identifier 130 indicates that the hearing device certificate 100 is a hearing device certificate, e.g. selected amongst a variety of certificate types, such as a hearing device family certificate type, a hearing device certificate type, a firmware certificate type, an access right certificate type, and a client device certificate type. The certificate type identifier 130 may be used to enable the hearing device 2 to identify what type of certificate it receives, stores, authenticates and/or retrieves. The hearing device certificate 100 may comprise a version identifier which indicates a data format version of the hearing device certificate. The hearing device 2 may use the certificate type identifier 130 and/or the version identifier to determine what type of data the hearing device certificate 100 comprises, what type of data is comprised in a field of the hearing device certificate 100. For example, the hearing device 2 may determine based on the certificate type identifier 130 and/or version identifier what field of the certificate comprises a digital signature 113, and which public key is needed to verify the digital signature 113. It may be envisaged that there is a one-to-one mapping between the certificate type identifier 130 and the public-private key pair used for generating the digital signature 113. The hearing device certificate 100 may comprise a length identifier that indicates the length of the hearing device certificate 100, e.g. in bits, bytes.

The hearing device certificate 100 optionally comprises a signing device identifier 136. The signing device identifier 136 refers to a unique identifier identifying the device (such as a manufacturing device 12, e.g. an integrated circuit card, a smart card, a hardware security module comprised in a manufacturing device 12) that has signed the hearing device certificate 100. The signing device identifier 136 may for example comprise a medium access control, MAC, address of the signing device, a serial number. The signing device identifier 136 allows for example the hearing device 2 to determine whether the signing device is e.g. black-listed or not, and thus to reject hearing device certificates 100 signed by a signing device that is black-listed.

The hearing device certificate 100 optionally comprises one or more hardware identifiers including a first hardware identifier 148 and/or a second hardware identifier 150. The first hardware identifier 148 is indicative of a hardware identifier of the processing unit 4 and is stored in a register of the processing unit 4. The first hardware identifier 148 may comprise a serial number, a medium access control, MAC, address, a chip identifier, or any combination thereof. The second hardware identifier 150 is indicative of a hardware identifier of the interface, such as a radio chip, and is stored in a register of the interface 8. The hearing device 2 may, e.g. at start-up, verify the hearing device certificate 100 by comparing the first hardware identifier 148 and the actual value of the corresponding register. This way, the hearing device 2 may determine if the hearing device certificate stored in the hearing device is intended for the hearing device 2 and reject the hearing device certificate if the hardware identifiers of the hearing device certificate do not match the hardware module register values of hearing device hardware.

The hearing device certificate 100 optionally comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the hearing device certificate 100, such as a timestamp of the manufacturing device 12 indicating a time instant when the hearing device certificate 100 is generated. The certificate timestamp 142 may be in form of e.g.: hour, min, date, month, year.

The hearing device certificate 100 comprises a digital signature 113 and/or a MAC. The digital signature 113 enables a proof or verification of authenticity and/or content of the hearing device certificate 100, such as verification of the signer legitimacy (e.g. whether the signer is a legitimate manufacturing device). The digital signature 113 is generated by the manufacturing device 12 using a device family private key during manufacturing of the hearing device.

Figure 4:
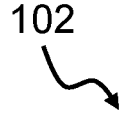

FIG. 4 schematically illustrates an exemplary access right certificate 102. The access right certificate 102 comprises a digital signature 113 and/or a MAC. The digital signature 113 enables a proof or verification of authenticity and/or content of the access right certificate 102, such as verification of the signer legitimacy (e.g. whether the signer is a legitimate manufacturing device). The digital signature 113 is generated by a signing device using an acces right private key.

The access right certificate 102 comprises a certificate type identifier 130. The certificate type identifier 130 indicates that the access right certificate 102 is an access right certificate, e.g. selected amongst a variety of certificate types, such as a hearing device family certificate type, a hearing device certificate type, a firmware certificate type, an access right certificate type, a security settings certificate, and a client device certificate type. The certificate type identifier 130 may be used to enable the hearing device 2 to identify what type of certificate it receives, stores, authenticates and/or retrieves. The access right certificate 102 may comprise a version identifier 132 indicative of data format version of the access right certificate 102. The hearing device 2 may use the certificate type identifier 130 and/or the version identifier 132 to determine what type of data the access right certificate 102 comprises and/or what type of data is comprised in a field of the access right certificate 102. The access right certificate 102 may comprise a length identifier 134 that indicates the length of the access right certificate 102, e.g. in bits, bytes. For example, the hearing device 2 may determine based on the certificate type identifier 130, the version identifier 132 and/or the length identifier 134 what field of the certificate 102 comprises digital signature 113, and which public key is needed to verify the digital signature 113. It may be envisaged that there is a one-to-one mapping between the certificate type identifier 130 and the public-private key pair used for generating the digital signature 113.

The access right certificate 102 optionally comprises a signing device identifier 136. The signing device identifier 136 refers to a unique identifier identifying the device (such as a manufacturing device 12, e.g. an integrated circuit card, a smart card, a hardware security module comprised in a manufacturing device 12) that has signed the access right certificate 102. The signing device identifier 136 may for example comprise a medium access control, MAC, address of the signing device, a serial number. The signing device identifier 136 allows for example the hearing device 2 to determine whether the signing device is e.g. black-listed or not, and thus to reject an access right certificate 102 signed by a signing device that has been black-listed, e.g. based on signing device revocation identifier(s) of secondary security settings.

The access right certificate 102 optionally comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the access right certificate 102, such as a timestamp of the manufacturing device 12 indicating a time instant when the access right certificate 102 was generated. The certificate timestamp 142 may be in form of e.g.: hour, min, date, month, year.

The access right certificate 102 comprises a first hardware identifier 148 indicative of a hardware identifier of the processing unit 4. Optionally, the access right certificate 102 may comprise further hardware identifiers indicative of respective further hardware identifiers of the processing unit 4. The access right certificate 102 comprises a second hardware identifier 150 indicative of a hardware identifier of the radio transceiver (radio chip) of the interface 8. Optionally, the access right certificate 102 may comprise further hardware identifiers indicative of respective further hardware identifiers of the interface 8.

The access right certificate 102 may comprise an issuer identifier 152. indicative of the person who has signed the access right certificate. The access right certificate 102 may comprise an addressee identifier 154 indicative of the person/group requesting the access right certificate 102.

The access right certificate 102 comprises a digital signature 113 and/or a MAC. The digital signature 113 enables a proof or verification of authenticity and/or content of the access right certificate 102, such as verification of the signer legitimacy (e.g. whether the signer is a legitimate manufacturing device). The digital signature 113 is generated by the manufacturing device 12 using an access right private key, e.g. during manufacturing of the hearing device.

Figure 5:
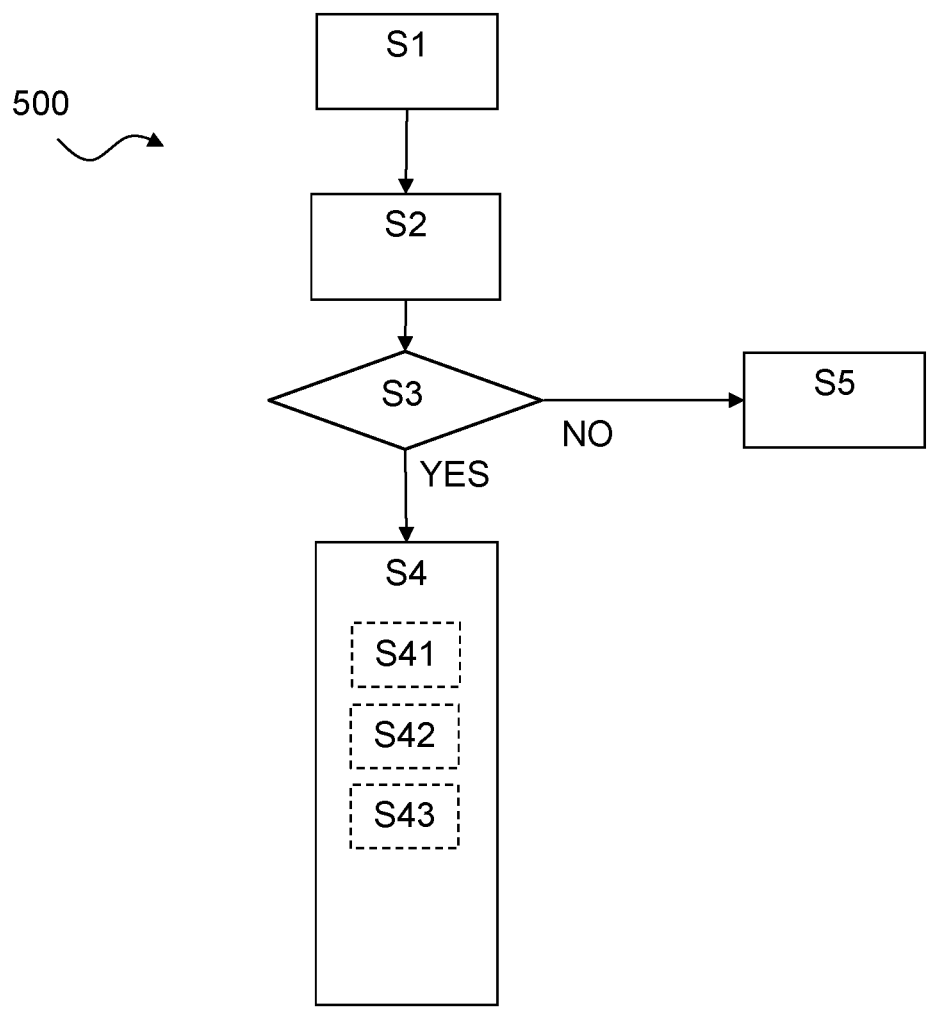

FIG. 5 schematically illustrates a flowchart of an exemplary method of operating a hearing device comprising a processing unit configured to compensate for hearing loss of a user of the hearing device; a memory unit; and an interface. The method 500 comprises obtaining S1 an access right certificate, e.g. access right certificate 102, by retrieving the access right certificate from the memory unit, the access right certificate comprising an access right identifier. The method 500 proceeds to verifying S2 the access right certificate; and if the access right certificate is verified S3, providing S4 an access right according to the access right identifier, wherein providing S4 an access right comprises granting S41 access to execute unauthorized firmware if the access right identifier is indicative of unauthorized firmware execution allowed. Providing S4 an access right optionally comprises granting S42 access to store firmware in the memory unit if the access right identifier is indicative of firmware storing allowed.

Providing S4 an access right optionally comprises granting S43 access to tracing of one or more hardware registers, if the access right identifier is indicative of hardware register access allowed.

Figure 6:
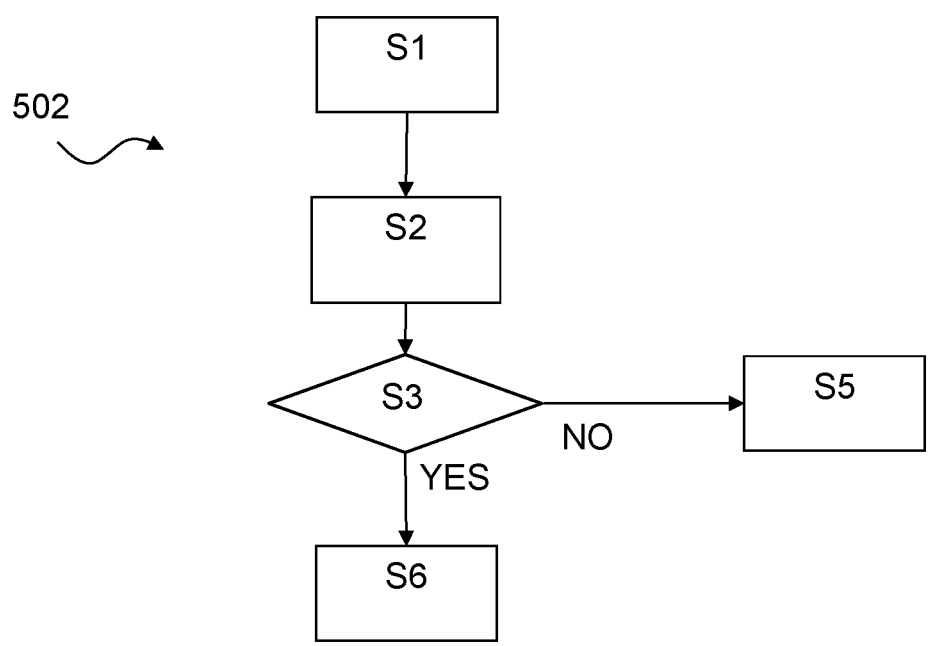

FIG. 6 schematically illustrates a flowchart of an exemplary method of configuring a hearing device. The method 502 includes obtaining S1 an access right certificate via an interface of the hearing device and verifying S2 the access right certificate. The method 502 comprises, if the access right certificate is verified S3, storing S6 the access right certificate in a memory unit of the hearing device.

Figure 7:
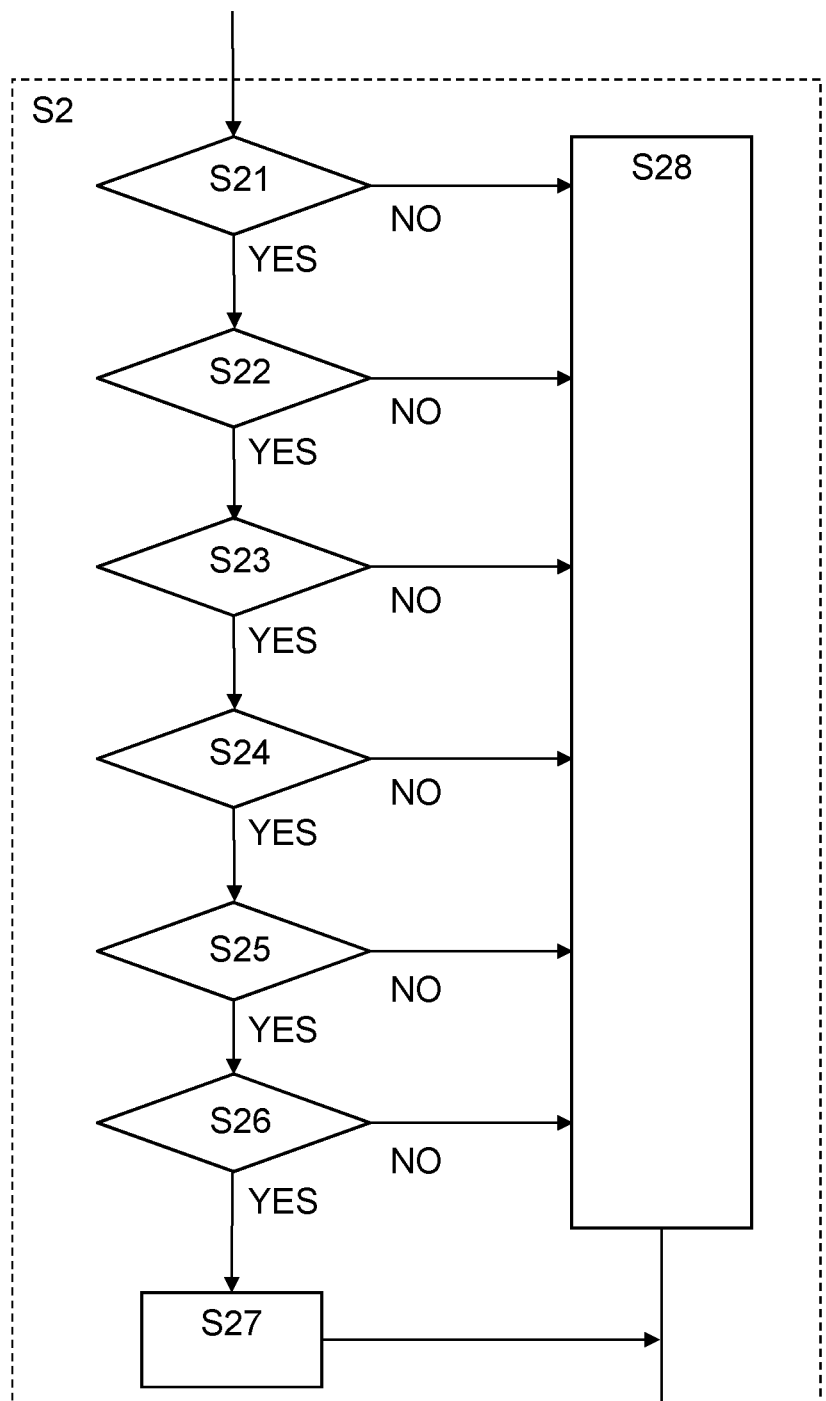

FIG. 7 schematically illustrates an exemplary verification of an access right certificate e.g. using a processing unit of a hearing device. To verify or verifying S2 the access right certificate comprises to verify S21 the certificate type identifier of the access right certificate 102 and to verify S22 the version identifier of the access right certificate 102 by verifying that the version indicated by the version identifier is supported by the firmware.

To verify or verifying S2 the access right certificate comprises to verify S23 at least one, such as the first hardware identifier and/or the second hardware identifier, of the one or more hardware identifiers based on the actual values of respective hardware registers and/or corresponding respective hardware identifiers of the hearing device certificate.

To verify or verifying S2 the access right certificate comprise to verify S24 the hardware platform identifier, the software platform identifier and the certificate timestamp of the access right certificate based on the hearing device certificate or at least parts thereof, e.g. based on respective hardware platform identifier, software platform identifier and certificate timestamp of the hearing device certificate.

To verify or verifying S2 the access right certificate comprises to verify S25 the signing device identifier by verifying that the signing device identifier is not black-listed, e.g. by appearing on a list of black-listed signing device identifiers stored in the memory unit.

To verify or verifying S2 the access right certificate comprises to verify S26 the digital signature of the access right certificate using an access right public key stored in the memory unit.

If any of S21, S22, S23, S24, S25, S26 results in non-verification, the access right certificate is not verified S28. The order of S21, S22, S23, S24, S25, and S26 may be changed. If all of S21, S22, S23, S24, S25, and S26 succeed, the access right certificate is verified S27. The processing unit may be configured to verify S21, S22, S23, S24, S25, and S26.

Figure 8:
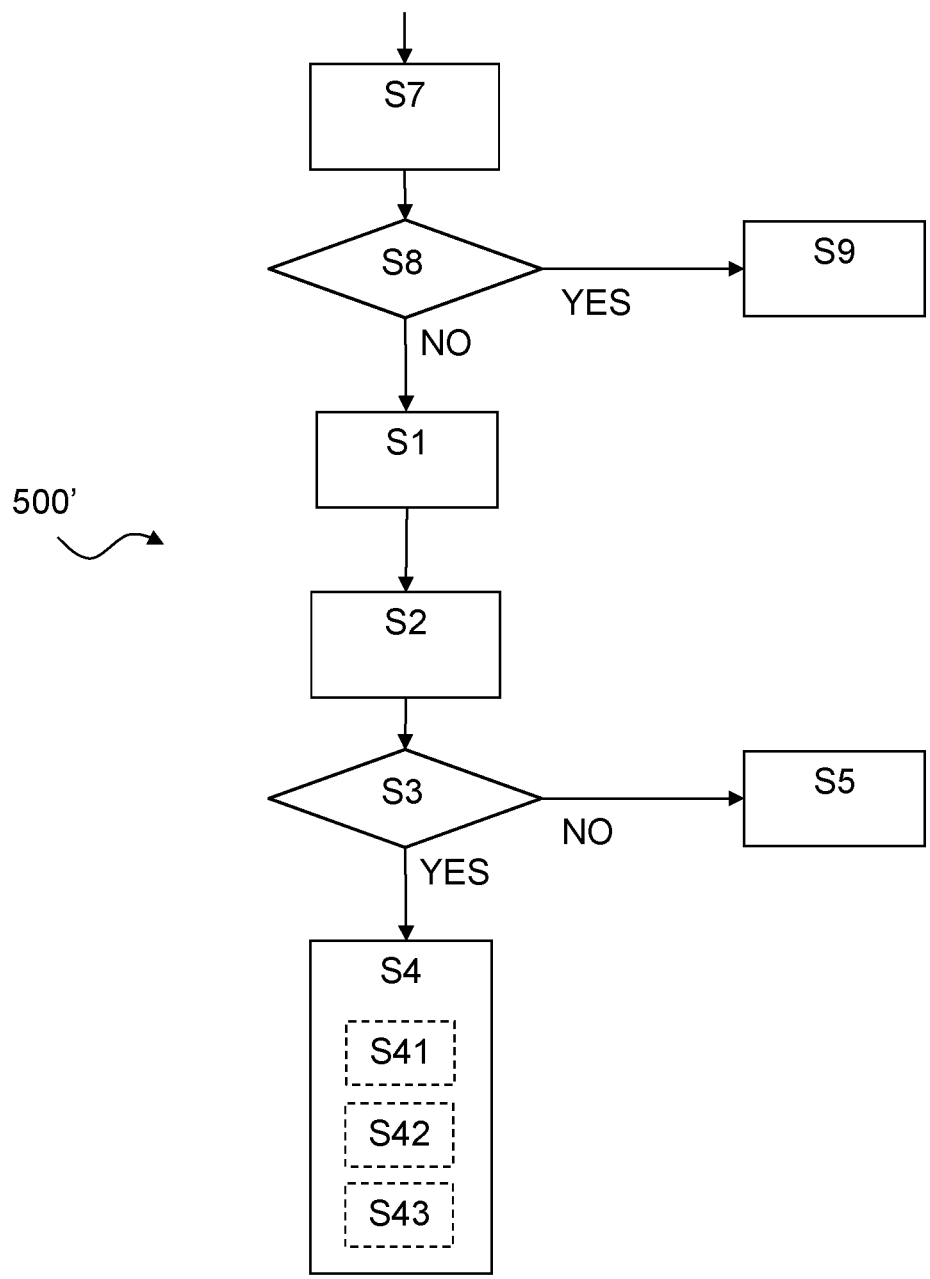

FIG. 8 schematically illustrates a flowchart of an exemplary method of operating a hearing device comprising a processing unit configured to compensate for hearing loss of a user of the hearing device; a memory unit; and an interface. The method 500' comprises verifying S7 the firmware e.g. by verifying the digital signature of a firmware certificate. The firmware certificate may be stored in the memory unit of the hearing device or received from a development device or other client device, e.g. a fitting device, configured to transmit data to the hearing device via the interface. If the firmware is not verified, the method proceeds to obtaining S1 an access right certificate. If the firmware is verified, the method 500' proceeds to normal operation S9.

Figure 9:
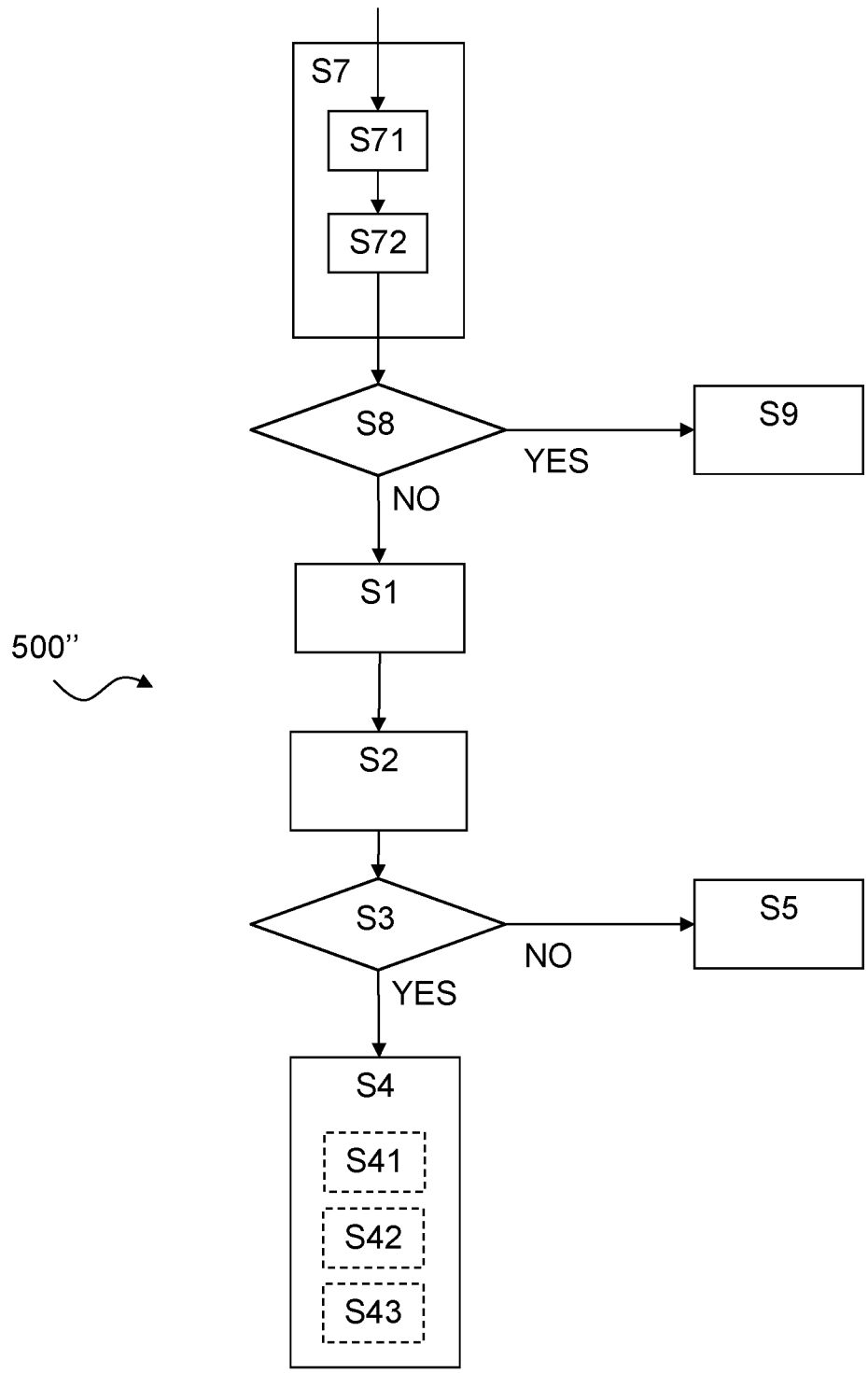

FIG. 9 schematically illustrates a flowchart of an exemplary method of operating a hearing device comprising a processing unit configured to compensate for hearing loss of a user of the hearing device; a memory unit; and an interface. The method 500" comprises verifying S7 the firmware. Verifying S7 the firmware comprises obtaining S71 a firmware certificate, e.g. from the memory unit and/or via the interface, and verifying S72 the firmware certificate by verifying a digital signature of the firmware certificate. Verifying S7 the firmware is successful if the digital signature of the firmware certificate is verified.

Exemplary hearing devices and methods are set out in the following items.

Item 1. A hearing device comprising
   a processing unit configured to compensate for hearing loss of a user of the hearing device;
   a memory unit; and
   an interface,
wherein the processing unit is configured to:
   obtain an access right certificate, the access right certificate comprising an access right identifier;
   verify the access right certificate; and
   if the access right certificate is verified, provide an access right according to the access right identifier.

Item 2. Hearing device according to item 1, wherein the access right certificate comprises a digital signature, and wherein to verify the access right certificate comprises to verify the digital signature.

Item 3. Hearing device according to any of items 1-2, wherein the access right certificate comprises a certificate type identifier, and wherein to verify the access right certificate comprises to verify the certificate type identifier.

Item 4. Hearing device according to any of items 1-3, wherein the access right certificate comprises a version identifier, and wherein to verify the access right certificate comprises to verify the version identifier.

Item 5. Hearing device according to any of items 1-4, wherein the access right certificate comprises one or more hardware identifiers, and wherein to verify the access right certificate comprises to verify at least one of the one or more hardware identifiers.

Item 6. Hearing device according to item 5, wherein the one or more hardware identifiers includes one or both of a first hardware identifier indicative of a hardware identifier of the processing unit and a second hardware identifier indicative of a hardware identifier of the interface.

Item 7. Hearing device according to any of items 1-6, wherein the access right certificate comprises a signing device identifier, and wherein to verify the access right certificate comprises to verify the signing device identifier.

Item 8. Hearing device according to any of items 1-7, wherein the access right certificate comprises one or more of a hardware platform identifier, a software platform identifier, and/or a certificate timestamp, and wherein to verify the access right certificate comprises to verify at least one of the hardware platform identifier, the software platform identifier, and the certificate timestamp.

Item 9. Hearing device according to any of items 1-8, wherein the hearing device has a hearing device certificate stored in the memory unit, wherein to verify the access right certificate is based on the hearing device certificate.

Item 10. Hearing device according to any of items 1-9, wherein to provide an access right according to the access right identifier comprises to allow control of one or more hearing device features.

Item 11. Hearing device according to any of items 1-10, wherein the access right certificate comprises an issuer identifier and/or an addressee identifier.

Item 12. Hearing device according to any of items 1-11, wherein the processing unit is configured to obtain a firmware certificate and to verify the firmware certificate, and wherein the processing unit is configured to retrieve and verify the access right certificate if the firmware certificate is not verified.

Item 13. Hearing device according to any of items 1-12, wherein the processing unit is configured to, if the access right certificate is not verified, abort normal operation.

Item 14. Hearing device according to any of items 1-13, wherein to obtain an access right certificate comprises retrieving the access right certificate from the memory unit.

Item 15. Hearing device according to any of items 1-14, wherein the processing unit is configured to grant full access to the hearing device if the access right identifier is indicative of full access allowed.

Item 16. Hearing device according to any of items 1-15, wherein the processing unit is configured to grant access to tracing of one or more hardware registers, if the access right identifier is indicative of hardware register access allowed.

Item 17. Hearing device according to any of the items 1-16, wherein the processing unit is configured to grant access to execute unauthorized firmware if the access right identifier is indicative of unauthorized firmware execution allowed.

Item 18. Hearing device according to any of items 1-17, wherein the processing unit is configured to grant acces to store firmware in the memory unit if the access right identifier is indicative of firmware storing allowed.

Item 19. Method of operating a hearing device comprising a processing unit configured to compensate for hearing loss of a user of the hearing device; a memory unit; and an interface, the method comprising
   obtaining an access right certificate, the access right certificate
   comprising an access right identifier;
   verifying the access right certificate; and
   if the access right certificate is verified, providing an access right according to the access right identifier.

The use of the terms "first", "second", "third" and "fourth", etc. does not imply any particular order, but are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element and vice versa.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES

1 system
2 hearing device
4 processing unit
5 microphone
6 memory unit 7 receiver
8 interface
10 client device
12 manufacturing device
16 server device
18 development device
21 communication link between client device and hearing device
22 communication link between server device and manufacturing device
23 communication link between hearing device and manufacturing device
24 communication link between server device and client device/fitting device
100 hearing device certificate
102 access right certificate
104 firmware certificate
112 hearing device identifier
113 digital signature
114 first hearing device key identifier
115 first set of hearing device keys
115A first primary hearing device key
115B first secondary hearing device key
115C first tertiary hearing device key
115D first quaternary hearing device key
116 second hearing device key identifier
117 second set of hearing device keys
117A second primary hearing device key
117B second secondary hearing device key
117C second tertiary hearing device key
117D second quaternary hearing device key
118 third hearing device key identifier
119 third set of hearing device keys
119A third primary hearing device key
119B third secondary hearing device key
119C third tertiary hearing device key
119D third quaternary hearing device key
130 certificate type identifier
136 signing device identifier
138 hardware platform identifier
140 software platform identifier
142 certificate timestamp
148 first hardware identifier
150 second hardware identifier
152 issuer identifier
154 addressee identifier
500, 500', 500" method of operating a hearing device
502 method of configuring a hearing device
S1 obtaining an access right certificate
S2 verifying the access right certificate
S3 verification of access right certificate ok?
S4 providing an access right
S5 abort normal operation
S6 storing the access right certificate
S7 verifying the firmware
S8 verification of firmware ok?
S9 normal operation

The invention claimed is:

1. A hearing device comprising:
a processing unit configured to compensate for hearing loss of a user of the hearing device; and
a memory unit communicatively coupled to the processing unit;
wherein the processing unit is configured to provide a security feature for the hearing device by:
obtaining access right data, the access right data comprising an access right identifier,
performing a verification based on the access right data, and
if the verification performed based on the access right data is successful, providing an access right for the hearing device, wherein a level or a type of the access right for the hearing device is based on the access right identifier.

2. The hearing device according to claim 1, wherein the access right data comprises a digital signature, and wherein the processing unit is configured to verify the digital signature.

3. The hearing device according to claim 1, wherein the access right data comprises one or more hardware identifiers, and wherein the processing unit is configured to verify at least one of the one or more hardware identifiers.

4. The hearing device according to claim 1, wherein the access right data comprises a hardware platform identifier, a software platform identifier, a certificate timestamp, or any combination of the foregoing, and wherein the processing unit is configured to verify the hardware platform identifier, the software platform identifier, the certificate timestamp, or a combination of the foregoing.

5. The hearing device according to claim 1, wherein the processing unit is configured to obtain a firmware certificate and to verify the firmware certificate, and wherein the processing unit is configured to perform the verification based on the access right data if the firmware certificate is not verified.

6. The hearing device according to claim 1, wherein the processing unit is configured to grant full access to the hearing device if the access right identifier is indicative of allowance of the full access.

7. The hearing device according to claim 1, wherein the processing unit is configured to grant access to execute firmware unauthorized by a manufacturer of the hearing device if the access right identifier is indicative of allowance of the firmware being executed.

8. The hearing device according to claim 1, wherein the processing unit is configured to grant access to store firmware in the memory unit if the access right identifier is indicative of allowance of the firmware being stored.

9. A method of operating a hearing device comprising a processing unit configured to compensate for hearing loss of a user of the hearing device and a memory unit communicatively coupled to the processing unit, the method comprising:
obtaining access right data, the access right data comprising an access right identifier;
performing a verification based on the access right data; and
if the verification performed based on the access right data is successful, providing an access right for the hearing device according to the access right identifier, wherein a level or a type of the access right for the hearing device is based on the access right identifier;
wherein the act of performing the verification based on the access right data, and the act of providing access right according to the access right, are performed to provide a security feature for the hearing device.

10. A hearing device comprising:
a processing unit configured to compensate for hearing loss of a user of the hearing device; and
a memory unit coupled to the processing unit;
wherein the processing unit of the hearing device is configured to:
obtain access right data, performing a verification based on the access right data, and if the verification performed based on the access right data is successful, provide an access right for the hearing device, wherein a level or a type of the access right is associated with an access right identifier;

wherein the access right data comprises one or more hardware identifiers identifying hardware in the hearing device; and wherein the processing unit is configured to perform the verification by verifying at least one of the one or more hardware identifiers.

11. The hearing device of claim 10, wherein the hearing device comprises a hearing aid.

12. A hearing device comprising:

a processing unit configured to compensate for hearing loss of a user of the hearing device; and a memory unit coupled to the processing unit;

wherein the processing unit of the hearing device is configured to:

obtain access right data, perform a verification based on the access right data, and if the verification performed based on the access right data is successful, provide an access right for the hearing device, wherein a level or a type of the access right is associated with an access right identifier;

wherein the processing unit is configured to grant access to store firmware in the memory unit if the verification performed based on the access right data is successful.

13. The hearing device of claim 12, wherein the hearing device comprises a hearing aid.

14. A hearing device comprising:

a processing unit configured to compensate for hearing loss of a user of the hearing device; and a memory unit coupled to the processing unit;

wherein the processing unit of the hearing device is configured to:

obtain access right data via a communication interface, the access right data comprising an access right identifier, perform a verification based on the access right data, and if the verification performed based on the access right data is successful, provide an access right for the hearing device, wherein a level or a type of the access right for the hearing device is associated with the access right identifier.

15. The hearing device of claim 14, wherein the hearing device comprises a hearing aid.

16. The hearing device of claim 14, wherein the memory unit is configured to store the access right data obtained via the communication interface.

\* \* \* \* \*